United States Patent [19]

DuBois

[11] Patent Number: 5,048,751
[45] Date of Patent: Sep. 17, 1991

[54] PRESSURE AND TEMPERATURE RELIEF VALVE AND DIAPHRAGM VALVE

[75] Inventor: Chester G. DuBois, Zion, Ill.

[73] Assignee: Outboard Marine Corporation, Waukegan, Ill.

[21] Appl. No.: 509,877

[22] Filed: Apr. 16, 1990

[51] Int. Cl.$^5$ .................. G05D 27/00; F16K 31/12
[52] U.S. Cl. .................... 236/92 C; 137/508
[58] Field of Search ............ 236/92 C, 34.5; 137/508, 493.9, 493

[56] References Cited

U.S. PATENT DOCUMENTS

| | | | |
|---|---|---|---|
| 1,972,170 | 9/1934 | Spencer | 137/139 |
| 2,259,846 | 10/1941 | Vernet et al. | 297/3 |
| 2,368,181 | 1/1945 | Vernet | 297/6 |
| 2,497,201 | 2/1950 | Banner | 236/92 |
| 2,570,432 | 10/1951 | Dillon | 236/92 |
| 2,740,586 | 4/1956 | Chaniot | 236/92 |
| 2,785,861 | 3/1957 | Kimm et al. | 236/92 |
| 2,810,527 | 10/1957 | Work | 236/80 |
| 3,386,469 | 6/1968 | Kelly | 137/508 X |
| 3,498,537 | 3/1970 | Wong | 236/34 |
| 3,512,710 | 5/1970 | Resta | 236/34 |
| 3,700,166 | 10/1972 | Foults | 236/34.5 |
| 3,724,753 | 4/1973 | Thornton | 236/92 |
| 3,804,113 | 4/1974 | Garcea | 137/508 X |
| 4,078,722 | 3/1978 | Luckenbill | 236/92 |
| 4,344,564 | 8/1982 | Magnuson | 236/34.5 |

Primary Examiner—William E. Wayner
Attorney, Agent, or Firm—Michael, Best & Friedrich

[57] ABSTRACT

A temperature and pressure responsive relief valve assembly preferably used in the cooling system of an internal combustion engine to control the rate of flow of a coolant fluid through the engine, which valve assembly comprises a housing having an inlet and an outlet, and a fluid passageway interconnecting the inlet and the outlet and including a valve seat, a pressure responsive diaphragm valve in the passageway and including a peripheral edge fixed to the housing and an annular combination valve member and valve seat defining an opening and forming a portion of the passageway and movable relative to the valve seat and movable toward the outlet in response to fluid pressure the inlet, a thermostat mounted in the passageway and including a valve member movable in response to operation of the thermostat, and a spring in the passageway for biasing the combination valve member and valve seat into a seated position on the valve seat and on the valve member, and a second spring for biasing the valve member into a seated position on the combination valve member and valve seat.

18 Claims, 1 Drawing Sheet

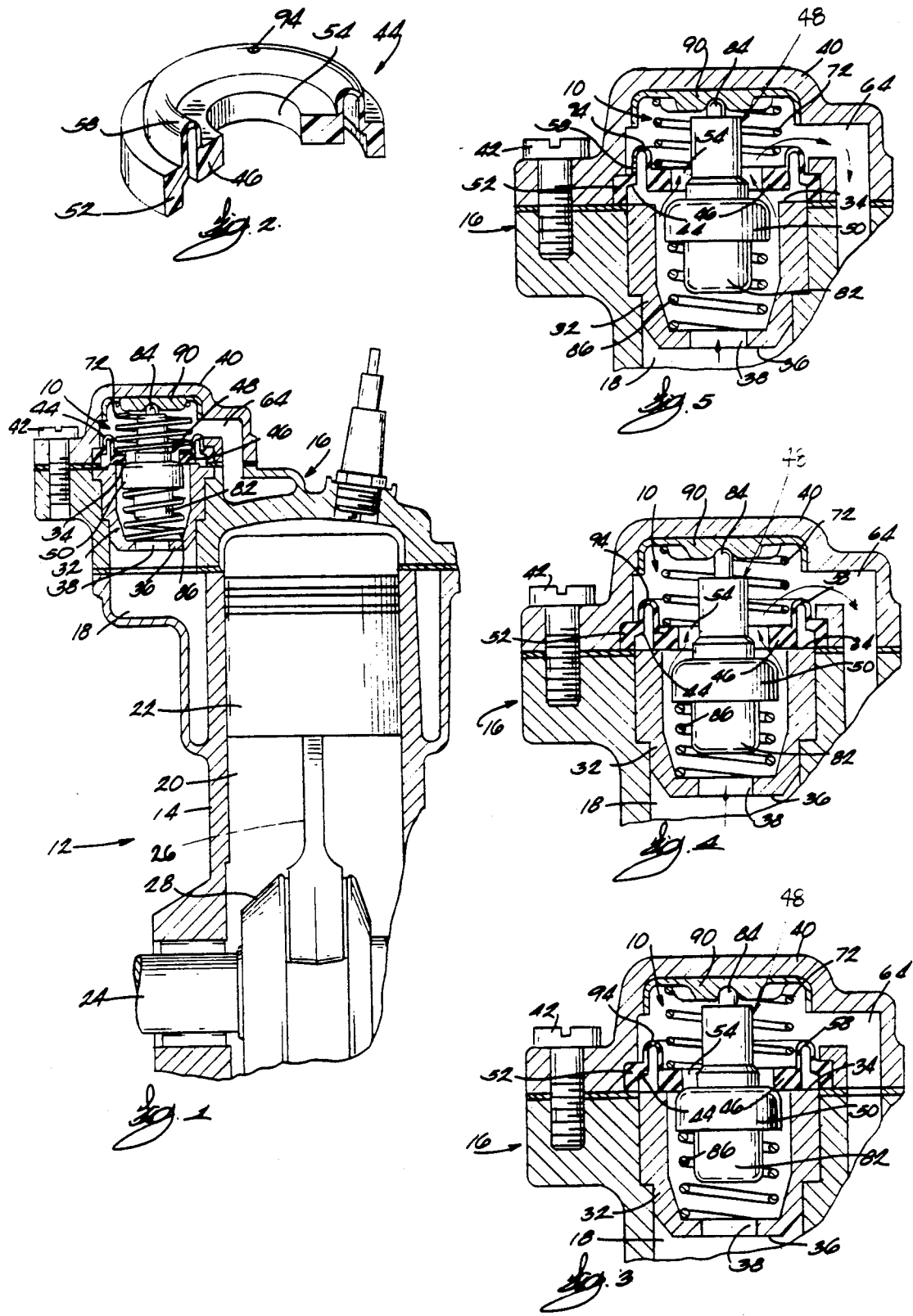

5,048,751

PRESSURE AND TEMPERATURE RELIEF VALVE AND DIAPHRAGM VALVE

BACKGROUND OF THE INVENTION

1. Field of the Invention

The invention relates generally to pressure and temperature relief valve arrangements, and, more particularly, to pressure and temperature relief valve arrangements for restricting coolant flow through a water cooled internal combustion engine. The invention also relates to a pressure responsive diaphragm valve for use in the valve arrangement.

2. Reference to Prior Art

Numerous valve arrangements have been employed for use in the cooling systems of internal combustion engines. Conventional temperature and pressure relief valve assemblies which are used in engine cooling systems and which restrict coolant flow through the engine include two separate and independent valve members which seat on separate valve seats. One of the valve members is generally temperature responsive, and the other of the valve members is generally operable in response to high fluid pressure in the cooling system caused by high engine speeds and the resulting high coolant flow rate. The temperature responsive valve is commonly actuated by a thermostat comprising a body enclosing a thermally responsive material, and a rod and piston arrangement which moves in response to expansion or contraction of the thermally responsive material. The pressure setting at which the pressure responsive valve unseats is commonly determined by compressing a biasing spring for the valve to a desired degree. The thermally responsive valve member is also commonly biased into a seated position by a spring.

Conventional valve arrangements commonly employ valves and valve seats made of metal. The use of metal valves and valve seats can lead to corrosion of the valve components.

Attention is directed to the following United States Patents:

| U.S. Pat. No. | Inventor | Issued |
| --- | --- | --- |
| 1,972,170 | Spencer | September 4, 1934 |
| 2,497,201 | Banner | February 4, 1950 |
| 2,570,432 | Dillon | October 9, 1951 |
| 2,740,586 | Chaniot | April 3, 1956 |
| 2,785,861 | Kimm et al. | March 19, 1957 |
| 2,810,527 | Work | October 22, 1957 |
| 3,498,537 | Backman Wong | March 3, 1970 |
| 3,512,710 | Resta | May 19, 1970 |
| 3,700,166 | Foults | October 24, 1972 |
| 3,724,753 | Thornton | April 3, 1973 |
| 4,078,722 | Luckenbill | March 14, 1978 |
| 4,344,564 | Magnuson | August 17, 1982 |

SUMMARY OF THE INVENTION

The invention provides a temperature and pressure responsive relief valve assembly comprising a housing including an inlet and an outlet, and a fluid passageway in the housing interconnecting the inlet and the outlet and including a first valve seat, a pressure responsive flexible member in the passageway and including a peripheral edge fixed to the housing and an annular combination first valve member and second valve seat defining an opening forming a portion of the passageway and being movable relative to the first valve seat, a thermally responsive assembly movably mounted in the passageway and including a thermally responsive actuator and a second valve member movable in response to operation of the actuator and relative to the combined first valve member and second valve seat for seating engagement between said second valve member and said combined first valve member and second valve seat, and means in the passageway for biasing the combined first valve member and second valve seat into engaged position on the first valve seat and on the second valve member.

The invention also provides a diaphragm valve for use in a pressure relief valve assembly including a housing having an inlet and an outlet, and a fluid passageway in the housing interconnecting the inlet and the outlet and including an outer valve seat, and an inner valve seat mounted in the passageway, the diaphragm valve comprising a flexible diaphragm adapted to be located within the passageway and including peripheral edge adapted to be fixed to the housing, an annular valve member on the flexible diaphragm and defining an opening forming a portion of the passageway and being movable relative to the outer valve seat and to the inner valve seat for seating engagement therewith.

In one embodiment, the diaphragm and pressure responsive valve member are integral and are made of a non-metallic material.

A principal feature of the invention is the provision of a temperature and pressure responsive relief valve assembly preferably used for automatically controlling coolant flow in a water cooled internal combustion engine, the temperature and pressure responsive valve members serving as valve seats for each other.

Another principal feature of the invention is the provision of a relief valve arrangement which is self-cleaning and which will remove dirt and debris from the valve seat of the thermally responsive valve member by revving the engine.

Another principal feature of the invention is the provision of a temperature and pressure responsive valve assembly which resists corrosion.

Still another principle feature of the invention is the provision of a temperature and pressure responsive valve assembly which provides a different size valve assembly for use in different size engines by interchanging only one part.

Other feature and advantages of the invention will become apparent to those skilled in the art upon review of the following detailed description, claims, and drawings.

DESCRIPTION OF THE DRAWINGS

FIG. 1 is a schematic diagram, partially in section, illustrating various of the features of the invention as applied to the cooling system of an internal combustion engine.

FIG. 2 is a perspective view, partially in section, of a diaphragm valve embodying various of the features of the invention.

FIG. 3 is an enlarged schematic view, partially in section, of the valve assembly shown in FIG. 1, and showing the valves in closed positions.

FIG. 4 is a view similar to FIG. 3, and showing the temperature responsive valve member in an unseated position in response to high inlet fluid temperature conditions.

FIG. 5 is a view similar to FIG. 3, and showing the pressure responsive valve member in an unseated position in response to high inlet fluid pressure conditions.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

A pressure and temperature responsive relief valve assembly 10 embodying various features of the invention is illustrated in the drawings. While the valve assembly 10 can be used in various systems, machines or apparatus, in the illustrated arrangement, the valve assembly 10 is used in the cooling system of an internal combustion engine to control the rate of flow of coolant fluid through the engine. As will be seen from the following, the valve assembly 10 illustrated in the drawings is intended to automatically control coolant flow through the engine to achieve engine operating temperatures within a desired temperature range.

Shown in FIG. 1 of the drawings is a portion of a water or coolant cooled, two-cycle internal combustion engine 12 which includes a cylinder block 14, a cylinder head 16 fixed to the cylinder block 14, a fluid or coolant passageway 18 extending through the cylinder block 14 and the cylinder head 16, and the valve assembly 10 located in the passageway 18. As is conventional, the engine 12 also includes a cylinder bore 20 containing a piston 22, the piston being connected to a crank shaft 24 through a rod 26 and a crank arm 28.

In the specific arrangement shown in the drawings, the cylinder head 16 serves as a frame or housing for the valve assembly 10, and receives a downstream frame or housing member 32. As illustrated in the drawings, the housing member 32 is located upstream of the valve assembly 10 and includes an annular valve seat or stop 34 and an inwardly directed annular flange 36 defining a fluid inlet 38. The cylinder head 16 includes a cover portion 40 which is removably attached to the rest of the cylinder head 16 so that access can be gained to the valve assembly 10. The cover 40 is attached by screws 42 or other conventional means.

Components of the valve assembly 10 include a pressure responsive flexible member which in the illustrated arrangement is in the form of a diaphragm 44 and which includes an annular pressure responsive valve member 46, and a temperature responsive assembly 48 including a temperature responsive valve member 50. Each of the valve members 46 and 50 serve as valve seats for each other.

As shown in FIG. 2, the diaphragm 44 also includes an outer or peripheral edge 52 which is fixed to the cylinder head 16, and a rolling or bellows portion 58.

While the pressure responsive valve member 46 can be a separate member attached to the diaphragm 44, in the illustrated arrangement, the valve member 46 is integral with the diaphragm 44. The annular Pressure responsive valve member 46 defines an opening 54 which forms part of the fluid passageway 18. The valve member 46 is moveable toward a fluid outlet 64 in response to increased fluid pressure at the inlet 38, and is selectively engageable with both the valve seat 34 and the temperature responsive valve member 50 to restrict fluid flow through the valve assembly 10. Fluid pressure is generally raised by increasing the speed of the engine, since at higher engine speeds a water or coolant pump (not shown) delivers more coolant to the engine 12.

The valve assembly 10 is provided with means for biasing the pressure responsive valve member 46 into a seated position on the valve seat 34 and on the temperature responsive valve member 50. While various means can be employed for biasing the pressure responsive valve 46, in the illustrated construction, the means for biasing includes a helical spring 72 which has a first end bearing against the cover 40 and a second end bearing against the pressure responsive valve member 46. The spring 72 is rated to allow the valve member 46 to open at a desired predetermined fluid pressure. Preferably, the spring 72 will maintain the valve member 60 on the valve seat 34 when the engine is operating at idle speeds and will allow the valve member 46 to unseat at engine speeds in excess of idle speed.

The temperature responsive assembly 48 is mounted in the passageway 18. While various temperature responsive assemblies can be employed, in the illustrated arrangement, the temperature responsive assembly 48 is in the form of a conventional thermostat which includes a thermostat body 82, a pin 84 disposed partially within the body 82, and the temperature responsive valve member 50. The valve member 50 is selectively engageable with the pressure responsive valve member 46 to restrict fluid flow through the valve assembly 10. As is conventional, the body 82 contains a thermally responsive expansible-contractable material (not shown) and serves as an actuator for the temperature responsive valve member 50.

The valve assembly 10 is also provided with means for supporting the thermally responsive assembly 48 in the passageway 18. While various supporting means can be employed, in the illustrated construction, the supporting means include a second helical spring 86 which includes a first end bearing against the flange 36 and a second end bearing against the valve member 50. The spring 86 serves the dual purpose of biasing the valve member 50 into a seated position on the pressure responsive valve member 46, and forcing the pin 84 to bear against the cover 40. The spring 86 is relatively stronger than the spring 72 to prevent the spring 72 from forcing the pin 84 out of engagement with the cover 40.

Typically, the thermostat body 82, the pin 84, and the temperature responsive valve member 50 are made of metal. Although the diaphragm 44 and the pressure responsive valve member 46 can be made of any suitable material, non-metallic materials, such as rubber, are preferred. Means are provided for isolating the metal components of the valve assembly 10 from the metal components of the cylinder head 16. While other isolating means can be employed, in the illustrated construction, the isolating means includes an isolator 90 which is made of a non-metallic material. The cover 40 may itself be non-metallic, so that the separate isolator 90 is not needed. The housing member 32 is also preferably made of a non-metallic material such as plastic. The use of non-metallic materials for the isolator 90 or cover 40, the pressure responsive valve member 46, and the housing member 32 serves to isolate the metal thermostat components from other parts made of metal, thereby tending to reduce or eliminate electrolytic corrosion. Furthermore, the use of non-metallic materials such as rubber aids in the reduction of corrosion and wear caused by the vibration of components in contact with one another.

As can been seen from the drawings, the valve assembly 10 or components thereof can be easily removed from the cylinder head 16 after first removing the cover 40 from the cylinder head 16. In addition, the valve assembly 10 can be in the form of a complete drop-in unit which can include the housing member 32 and the isolator 90. The parts comprising the valve assembly 10, or the entire valve assembly 10, may be replaced when warn or defective.

The valve assembly 10 can be used in engines of all sizes by changing a single part, such as the diaphragm 44. For example, when the valve assembly 10 is used in larger engines requiring greater coolant flow rates, or smaller engines requiring lesser coolant flow rates, the valve member 46 of diaphragm 44 can be reduced or enlarged, respectively. Changing the size of the valve member 46 is accompanied by a change in the size of the opening 54 which is defined by the valve member 46. As previously mentioned, the opening 54 forms part of the passageway 18, so that enlargement or reduction of the opening 54 allows greater or lesser coolant flow rates through the valve assembly 10.

An advantage of the valve assembly 10 is that it can be sized to maximize the speed of the coolant flowing through the valve assembly while still maintaining a flow rate to properly cool the engine. Higher coolant flow speeds assist in flushing debris past the valve assembly 10. The sizes of the pressure and temperature responsive valve members 46 and 50 can be selected to maximize the speed of coolant flow around the valve members and through the opening 54 while still allowing a coolant flow rate sufficient to cool the engine.

FIG. 3 illustrates the valve assembly 10 which is closed and which is operating at inlet fluid pressure and temperature levels below that required to open the valve assembly 10. The valve assembly 10 is provided with means for purging air in the system. While various purging means can be employed, in the disclosed construction, the purging means includes an orifice 94 which is located in the bellows portion 58 of the diaphragm 44 so that diaphragm flexure prevents mineral build-up in the orifice. Preferably, the valve assembly 10 remains closed at engine idle speeds when the engine is cold.

FIG. 4 shows the temperature responsive valve member 50 in an open position in response to increased inlet fluid temperature. As the engine 12 warms up, increased fluid temperatures cause the thermally responsive material contained with the thermostat body 82 to expand which in turn causes the valve member 50 to move relative to the pressure responsive valve member 46 and against the force of the spring 86 to permit fluid flow in the direction shown by the arrows in FIG. 4. When the engine is shut off or when the fluid flow rate is high enough to prevent the coolant from becoming sufficiently warmed, the thermally responsive material will contract and the spring 86 will bias the thermally responsive valve member 50 toward the pressure responsive valve 46.

Referring to FIG. 5, the valve assembly 10 is shown acting under inlet fluid pressure levels sufficient to move the pressure responsive valve member 46 against the force of the spring 72 and away from the valve seat 34 and the temperature responsive valve member 50. As engine speed is reduced and fluid pressure decreases, the spring 72 biases the pressure responsive valve 46 back towards a seated position on the valve seat 34 and on the temperature responsive valve member 50.

Foreign matter which clogs the valve assembly 10 can cause poor engine performance. For example, a chip of foreign matter may become lodged between the valve members 46 and 50 so that the valve members do not properly seal when engaging one another. When the engine is started, the chip may cause undesireable fluid leakage through the valve assembly 10. The increased fluid flow caused by the leakage can slow warm-up of the engine and can lead to engine difficulties such as rough idle.

Because the temperature responsive valve member 50 seats on the pressure responsive valve member 46, dirt or debris can be flushed from the valve assembly 10 without movement of the temperature responsive valve member 50. To remove a foreign substance lodged between the valve members 46 and 50, the engine can be revved to increase engine speed so that increased fluid pressure at the inlet 38 causes the pressure responsive valve member 46 to open so that the dirt or debris from between the valve members 46 and 50 is flushed out.

Various features of the invention are set forth in the following claims.

I claim:

1. A temperature and pressure responsive relief valve assembly comprising a housing including an inlet and an outlet, and a fluid passageway in said housing interconnecting said inlet and said outlet and including a valve stop, a pressure responsive flexible member in said passageway and including a peripheral edge fixed to said housing and an annular combination first valve member and valve seat defining an opening forming a portion of said passageway and being movable relative to said valve stop, a thermally responsive assembly movably mounted in said passageway and including a thermally responsive actuator and a second valve member movable in response to operation of said actuator and relative to said combined first valve member and valve seat for seating engagement between said second valve member and said combined first valve member and valve seat, and means in said passageway for biasing said combined first valve member and valve seat into engaged position on said valve stop and on said second valve member.

2. A relief valve assembly as set fourth in claim 1, wherein said combined first valve member and valve seat is made of non-metallic material.

3. A relief valve assembly as set forth in claim 2, wherein said flexible member comprises a diaphragm and wherein said thermally responsive actuator extends through said opening.

4. A relief valve assembly as forth in claim 3, wherein said combined first valve member and valve seat is integral with said flexible member.

5. A relief valve assembly as set forth in claim 1, wherein said flexible member is made of a non-metallic material.

6. A relief valve assembly as set forth in claim 1, wherein said housing includes a top portion and another portion and means for removably fastening said top portion to said other portion of said housing.

7. A relief valve assembly as set forth in claim 1, wherein said flexible member has therein an orifice.

8. A relief valve assembly as set forth in claim 1, and further comprising means in said passageway for biasing said second valve member into a seated position on said combined first valve member and valve set.

9. A relief valve assembly as set forth in claim 8, wherein said means for biasing said second valve member has greater relative strength than said means for biasing said combined first valve member and valve seat.

10. A diaphragm valve for use in a pressure relief valve assembly including a housing having an inlet and an outlet, and a fluid passageway in the housing interconnecting the inlet and the outlet and including an outer valve stop, and an inner valve seat mounted in the passageway, said diaphragm valve comprising a flexible diaphragm adapted to be located within the passageway and including a peripheral edge adapted to be fixed to the housing, and an annular valve member on said flexible diaphragm and defining an opening forming a portion of the passageway and being movable relative to said outer valve stop and to said inner valve seat for seating engagement therewith.

11. A diaphragm valve as set forth in claim 10, wherein said diaphragm valve includes an integral valve member.

12. A diaphragm valve as set forth in claim 10 wherein said valve member is made of a non-metallic material.

13. A diaphragm valve as set forth in claim 10, wherein said valve member has therein an orifice.

14. A diaphragm valve as set forth in claim 10, wherein said inner valve seat is movable relative to said valve member and to said outer valve stop in response to changes in the temperature of fluid in said passageway.

15. A diaphragm valve as set forth in claim 14 and further comprising member for biasing said valve member toward said outer valve stop and said inner valve seat, and means for biasing said inner valve seat toward said valve member.

16. A temperature and pressure responsive relief valve assembly comprising a housing including an inlet and an outlet, and a fluid passageway in said housing interconnecting said inlet and said outlet and including a valve stop, a pressure responsive flexible member in said passageway and including a peripheral edge fixed to said housing and an annular combination first valve member and valve seat defining an opening forming a portion of said passageway and being movable relative to said valve stop, a thermally responsive assembly movably mounted in said passageway and including a thermally responsive actuator extending through said opening and a second valve member movable in response to operation of said actuator and relative to said combined first valve member and valve seat for seating engagement between said second valve member and said combined first valve member and valve seat, means in said passageway for biasing said combined first valve member and valve seat into engaged position on said valve stop and on said second valve member, and means in said passageway for biasing said second valve member into a seated position on said combined first valve member and valve seat.

17. A relief valve assembly as set forth in claim 16, wherein said means for biasing said second valve member has greater relative strength than said means for biasing said combined first valve member and valve seat.

18. A relief valve assembly as set forth in claim 16, wherein said combined first valve member and valve seat is integral with said flexible member.

* * * * *